United States Patent [19]

Franco-Ferreira et al.

[11] Patent Number: 4,675,966
[45] Date of Patent: Jun. 30, 1987

[54] METHOD FOR MANUFACTURING A GUIDE BASE OF A VALVE

[75] Inventors: Edgard A. Franco-Ferreira, Leucadia, Calif.; George H. Blume, Odessa, Tex.

[73] Assignee: Harrisburg, Inc., Houston, Tex.

[21] Appl. No.: 827,004

[22] Filed: Feb. 7, 1986

[51] Int. Cl.⁴ .............................................. B21D 53/00
[52] U.S. Cl. ................................ 29/157.1 R; 29/434; 29/DIG. 4
[58] Field of Search ....... 29/157 R, 157.1 R, 157.1 A, 29/428, DIG. 4

[56] References Cited

U.S. PATENT DOCUMENTS 3,491,791 1/1970 Polk ........................... 29/157.1 R X

OTHER PUBLICATIONS

TRW Mission Service Valve and Imperial Valve & Seat—1982-1983, Composite Catalog for Oil Field Equipment and Services, published by World Oil.
Harrisburg Roughneck Valve and Seat—1986-1987, General Product Catalog.
"Brazing", Chapter 60, from the Welding Handbook, American Welding Society, 6th Edition (1971).
Harrisburg Roughneck Valve and Seat—Fold out Specification Sheet (3 pages), (1985):

Primary Examiner—Howard N. Goldberg
Assistant Examiner—Ronald S. Wallace
Attorney, Agent, or Firm—Pravel, Gambrell, Hewitt & Kimball

[57] ABSTRACT

A method for manufacturing the guide base of a valve and assembly of that valve is disclosed. The guide base is made from flat plate. Two similar workpieces are stamped out of plate. Each workpiece comprises two leg members joined by a central portion. The workpieces are engaged at their central portions and inserted into an upper valve body having at least one insert slot. The final assembly is permanently joined together.

15 Claims, 16 Drawing Figures

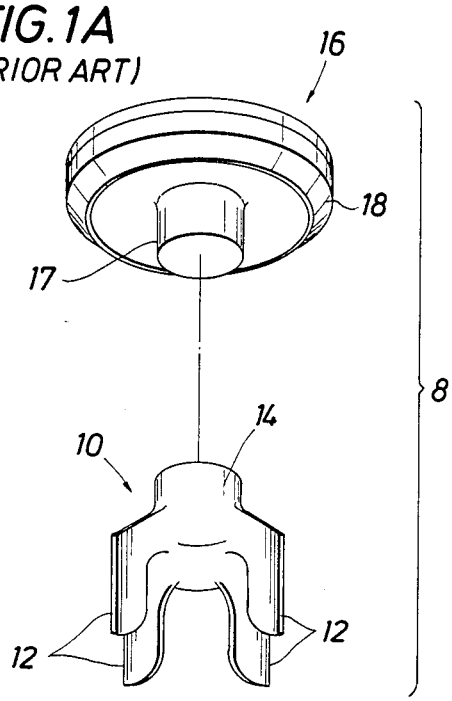
FIG.1A (PRIOR ART)
FIG.1B (PRIOR ART)
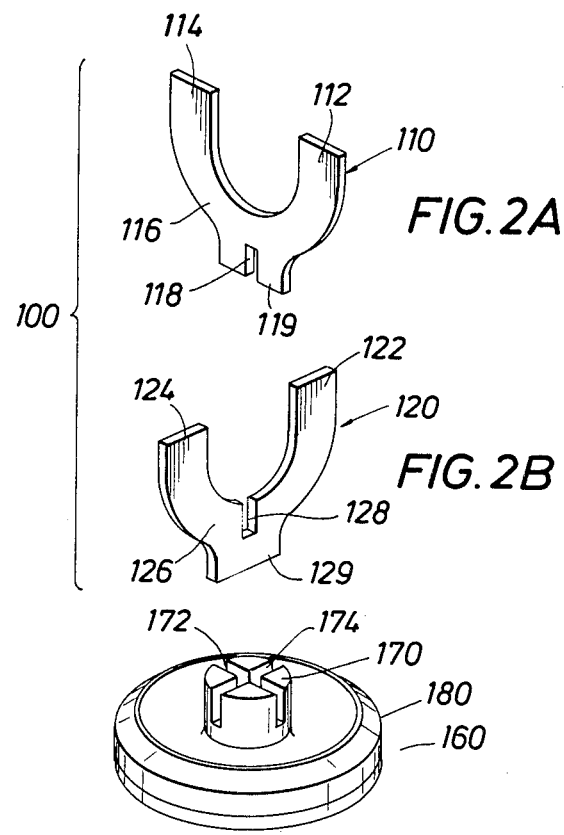
FIG.2A
FIG.2B
FIG.2C
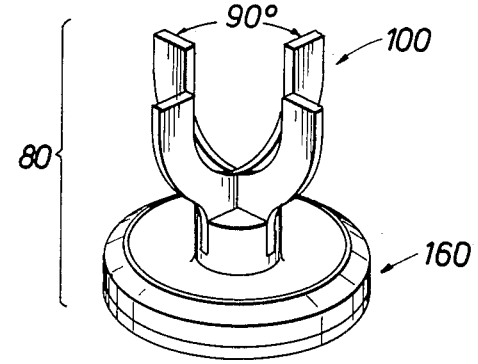
FIG.2D

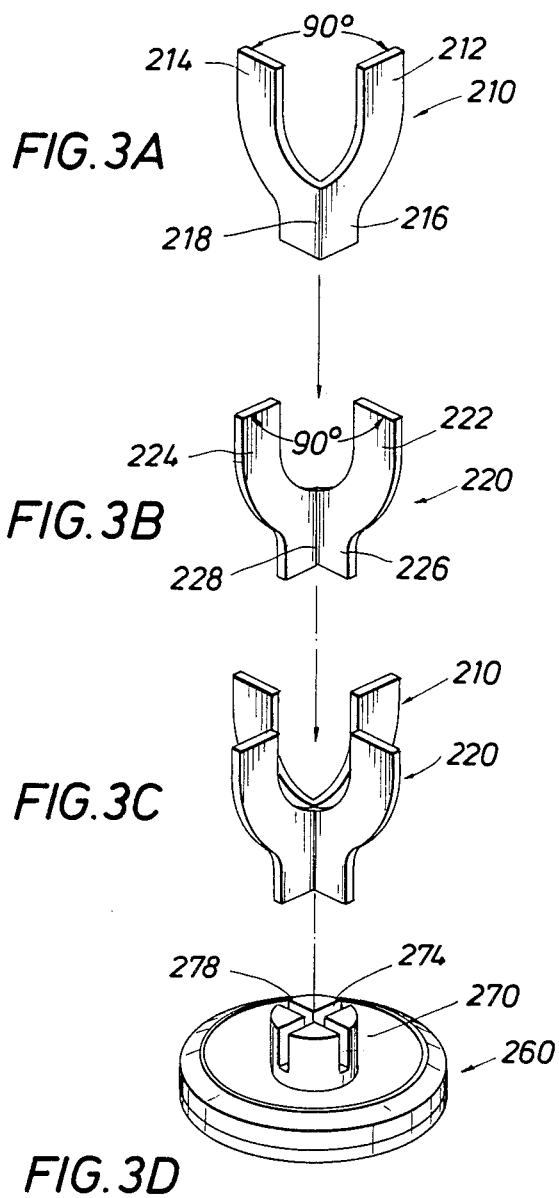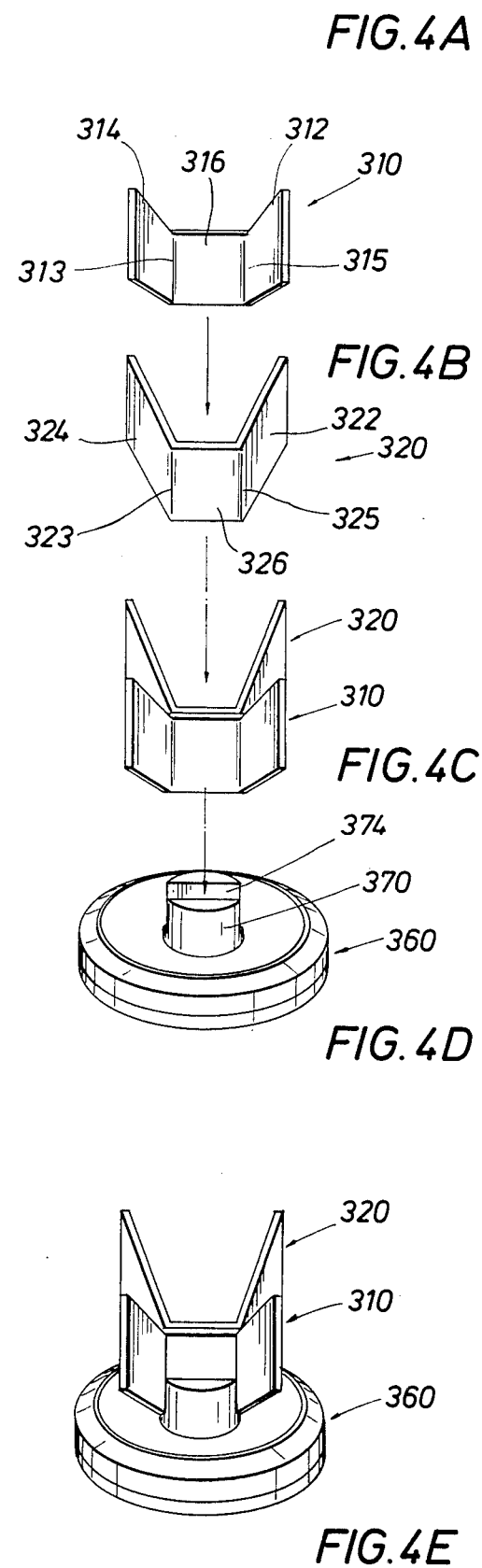

METHOD FOR MANUFACTURING A GUIDE BASE OF A VALVE

BACKGROUND OF THE INVENTION

1. Technical Field of the Invention

This invention relates to a method for manufacturing a portion of a valve and assembling the valve. More particularly, this invention relates to a method for manufacturing the guide base of a full-open valve and attaching the guide base to an upper valve body of the valve.

2. Description of the Prior Art

In oilfield drilling and well servicing operations it is frequently necessary to introduce large quantities of drilling mud and other fluids into the drilling or producing string to promote the drill operations or to stimulate the producing formation. To accomplish this, large surface pumps are used which must be capable of pumping up to 200 gallons per minute at pressures in excess of 15,000 psi. Such pumps include one or more valves which control the flow of the drilling mud or other fluids being injected from surface storage vessels, through the pump into the string or completion tubing. Normally, such valves are either in a full-open or a full-closed position. Because of the large quantities of fluids which must pass by the valve when in an open position, it is important that the valve have a structure which minimizes the interference with fluids flowing past. This is determined by that portion of the valve which holds the valve head or the upper valve body in place (referred to herein also as the guide base) and permits smooth vertical movement of the upper valve body from a closed to an open position and vice versa.

Prior art valves include the Harrisburg Imperial valve and seat as shown at page 4115 of the 1982-83 *Composite Catalog for Oil Field Equipment and Services*, published by World Oil, and the Harrisburg Roughneck TM valve and seat available through Harrisburg, Inc. of Houston, Tex. and shown on page 5 of Harrisburg's 1986-87 *General Product Catalog* and FIGS. 1a and 1b hereto.

The Imperial valve attempts to maximize fluid flow by using a single shaft attached to the upper valve body. However, to keep the valve vertical, this design requires a series of cross-arms located within the seating cylinder which extend horizontally from the walls of the seating cylinder inwardly to a ring member. The shaft of the valve is inserted into the ring member and is thereby restrained horizontally. However, due to available materials, the cross-arms and the ring member are usually of a minimum size which restricts up to one-third of the cross-sectional area of the seating cylinder through which the fluids must flow. Historically, Imperial valves were used in mud pumps in drilling operations.

In an attempt to improve on the flow interference characteristics of the Imperial valve in fracturing operations, the guide base was modified to include four leg members adapted to engage the walls of the seating cylinder. The leg members permit vertical movement of the valve but prevent a cocking movement which might otherwise jam the valve within the seating cylinder. For example, see the TRW Mission Service Master ® valve at page 7833 of the 1982-83 *Composite Catalog for Oil Field Equipment and Services*. It was found that such a guide base configuration is preferred because it provided a minimal amount of interference with fluid flow while still providing sufficient horizontal and vertical support to the upper valve body. However, such guide bases were manufactured using the forging process which has many inherent manufacturing disadvantages. In an attempt to improve on the performance of such a design, Harrisburg offers the Roughneck TM valve.

In the manufacture of the Roughneck TM valve, the upper valve body is forged while the guide base is made by the investment casting process (also known the "lost-wax" process), well known to those skilled-in-the-art. Very briefly, the investment casting process as it applies to the Roughneck TM valve is as follows. Model guide bases are made from wax using an injected pattern mold. Several of the wax guide bases are then assembled in a cluster or "tree" arrangement and dipped into a ceramic slurry. The slurry may be a paste comprising a fine-grained refractory mold material and a bonding agent so that the wax mold becomes coated with this mixture. The ceramic mold is then fired in a furnace causing the wax models to melt. The result is a casting mold made of ceramic. The desired final material is then selected and poured into the mold. The mold is then broken and the individual guide assemblies removed and prepared for attachment to the forged upper valve bodies. Each guide base is attached to an upper valve body using inertia friction welding, a technique well known to those skilled-in-the-art.

The investment casting process, however, is expensive and time-consuming. There is a need, therefore, for an inexpensive method of manufacturing the guide base and attaching it to the upper valve body.

SUMMARY OF THE INVENTION

The present invention is an improved method for manufacturing the guide base of a valve from flat plate and attaching the guide base to the upper valve body. Initially, two workpieces are stamped from flat plate. Each workpiece has at least two leg members and a central portion between the leg members. The central portions of each workpiece are then engaged and inserted into a slot within the upper valve body. The workpieces and the upper valve body are then permanently joining, for example by conventional welding or by brazing a filler material within the joints at the connection of the central portions of the workpieces and at the attachment of the central portions to the upper valve body.

This description is intended as a summary only. The specific details of this invention will be described in the specification to follow and in the claims appended thereto.

BRIEF DESCRIPTION OF THE DRAWINGS

FIGS. 1a-b are isometric views of the prior art Roughneck TM valve illustrating a guide base manufactured by the investment casting process. In FIG. 1a, the guide base has not been attached to the upper valve body. In FIG. 1b, the guide base has been attached to the upper valve body and is shown in an open-position within a seating cylinder which is shown in partial cutaway.

FIGS. 2a-d are isometric views of the preferred embodiment of the present invention shown in segmented assembly stage.

FIGS. 3a-e are isometric views of an alternate embodiment of the present invention shown in segmented assembly stage.

FIGS. 4a–e are isometric views of yet another alternate embodiment of the present invention shown in segmented assembly stage.

DETAILED DESCRIPTION OF THE INVENTION

Referring to FIGS. 1a and 1b, a Roughneck TM valve 8 is shown having an investment cast guide base 10. The guide base 10 includes four leg members 12 cast in an integral manner to a central core 14. The valve 8 includes an upper valve body 16 having a neck 17. The upper valve body is one piece and is forged from a high alloy steel for maximum impact strength. The guide base 10 is attached to the neck 17 by inertia friction welding. A polyurethane insert 18 is located around the periphery of the body and provides the contact seal. The valve 8 is housed within a seating cylinder or sleeve 20 which is part of the pump (not shown). The top of the sleeve 20 includes a beveled seat 22 adapted to engage the polyurethane insert 18 and provide the seal which prevents the drilling mud or other fluid from flowing past the valve when in a closed position.

FIGS. 2a–d illustrate the preferred embodiment of the present invention. A guide base 100 is manufactured from a first workpiece 110 and a second workpiece 120 which are stamped from flat plate. The first workpiece 110 includes leg members 112 and 114 and a central portion 116 between the leg members 112 and 114. Similarly, the second workpiece 120 includes leg members 122 and 124 and a central portion 126. The first workpiece 110 includes a slot 118 substantially parallel with the leg members 112 and 114. The second workpiece 120 also includes a slot 128 substantially parallel with the leg members 122 and 124. The workpieces 110 and 120 are adapted to engage by means of the slots 118 and 128 so that the workpieces are oriented within vertical planes substantially 90° to one another.

The valve 80 includes the guide base 100 and an upper valve body 160 similar to the upper valve body 16 of the prior art. The upper valve body 160 is preferably a one piece valve body having a polyurethane insert 180 or a similar type insert for sealing purposes. Usually, the insert 180 would not be inserted until after final assembly and any heat treatments, as discussed below, of the valve to avoid damaging the insert. The upper valve body 160 includes a neck 170 having two slots 172 and 174 oriented at substantially 90° to one another. In this manner, the ends 119 and 129 of workpieces 110 and 120 may be inserted into slots 172 and 174 resulting in the assembly shown in FIG. 2d. The workpieces are permanently attached to each other and to the upper valve body using the brazing process described below.

FIGS. 3a–d illustrate an alternate embodiment having workpieces 210 and 220. The first workpiece 210 includes leg members 212 and 214 and a central portion 216. The second workpiece 220 includes leg members 222 and 224 and a central portion 226. After being stamped from flat plate, each workpiece 210 and 220 is bent at the approximate centers 218 and 228 of the central portions 216 and 226, respectively. Each workpiece is bent such that the leg members 212 and 214 of workpiece 210 and the leg members 222 and 224 of workpiece 220 are oriented at substantially 90° to one another. The workpieces 210 and 220 are then inserted in an upper valve body 260 identical to that shown with respect to FIGS. 2c and 2d above having slots 274 and 278 within neck 270. The workpieces 210 and 220 are then permanently attached to each other and to the upper valve body 260.

FIGS. 4a–e illustrate yet another embodiment having workpieces 310 and 320. The first workpiece 310 includes leg members 312 and 314 and a central portion 316. The second workpiece 320 includes leg members 322 and 324 and a central portion 326. After being stamped from flat plate, each workpiece 310 and 320 is bent. The first workpiece 310 is bent at the junction 313 between the central portion 316 and the leg member 314. The first workpiece is also bent at the junction 315 between the central portion 316 and the leg member 312. The second workpiece 320 is bent at the junction 323 between leg member 324 and central portion 326 and at the junction 325 between leg member 322 and central portion 326. Preferably, each leg member is bent the same amount with respect to the plane of its central portion. This angle is preferably at least 10° but less than 80°. More preferably, this angle is between 60° and 80°. Each workpiece is then inserted in an upper valve body identical to that described above with respect to FIGS. 2c, 2d, 3c, and 3d except that a single slot 374 is machined into the neck 370 of the upper valve body 360. Following assembly, the first workpiece 310, second workpiece 320 and upper valve body 360 are permanently joined.

As used herein the attachment or contact of two workpieces together as shown in FIGS. 2a–b, 3c and 4c may be referred to as the engagement of the central portions of the workpieces.

In discussing the embodiments disclosed herein, the permanent joining of the workpieces and the upper valve body may be accomplished by conventional welding techniques well known to those skilled-in-the-art or by the brazing process.

The brazing process is also well known to those skilled-in-the-art and is understood to mean a group of joining processes wherein coalescence is produced by heating to a suitable temperature and by using a filler material having a liquidus (flow point) above 800° F. (427° C.) and a melting temperature below that of the metal to be joined. For a more thorough discussion of brazing theory see "Brazing", Chapter 60, *Welding Handbook*, American Welding Society, 6th Edition (1971). Generally, the brazing process comprises the application of a brazing compound followed by heat treatment. The application of the brazing compound as used herein is accomplished generally in one of two ways. The workpiece may be electroplated with a brazing compound, preferably a copper base brazing compound. Electroplating is a well known technique and generally involves coating or dipping the workpiece in a metal bath then introducing an electric current across the workpiece. This creates an electric potential between the workpiece and metal and causes the depositing of the metal (positive electrode) on the surface of the workpiece (negative electrode). Alternatively, the brazing compound may be applied directly to joints following assembly of the valve. In the alternate case, the compound is preferably a copper base compound having an acrylic constituent which makes the compound easier to handle. Following application, the entire assembly is heated to a temperature above the liquidus of the brazing compound but below the melting temperature of the base metal. With the copper and acrylic compound, the acrylic vaporizes during heat treatment leaving the copper as the joining compound. Besides copper base compounds other suitable brazing compounds may be used such as a nickel base, silver base, and copper-zinc base. Such compounds as well as others are discussed in Chapter 60 of the *Welding Handbook*, which chapter is hereby incorporated by reference.

The preferred material for the fabrication of the workpieces under the anticipated operating conditions is a low carbon alloy steel such as AISI 8620. Using a copper base brazing compound, the valve is heated once assembled, to a temperature of 1,980° F. which is the liquidus temperature for copper base filler metals. At this temperature, the copper metal is flowing freely within the joints and upon cooling solidifies permanently joining the workpieces and the upper valve body together.

The foregoing disclosure and description of the invention are illustrative and exemplary. Various changes in size, shape, materials of construction, and configuration as well as changes in details of the illustrated construction and assembly may be made within the scope of the appended claims and without departing from the spirit of the invention.

What is claimed is:

1. A method for manufacturing the guide base of a valve from flat plate and attaching said guide base to an upper valve body, said method comprising the steps of:
   stamping out from flat plate first and second workpieces, each said workpiece having at least two leg members and a central portion between said leg members;
   engaging said central portions of said first workpiece and said second workpiece and inserting said central portions of said workpieces into said upper valve body; and
   permanently joining said central portions of said first and second workpieces and said upper valve body together thereby forming said valve.

2. The method according to claim 1, wherein said joining step comprises brazing which includes:
   applying a brazing compound to the surfaces of said workpieces by electroplating prior to said engagement and insertion step; and
   heating said workpieces and said upper valve body following said engagement and insertion step so that said brazing compound melts and flows joining said workpieces and upper valve body together following the removal of said heat.

3. The method according to claim 1, wherein said first and second workpieces having slots in said central portion substantially parallel with said leg members and said upper valve body having two insert slots oriented at substantially 90° to one another, said engagement and insertion step comprising:
   attaching said first and second workpieces together through said slots of said central portions so that said workpieces are oriented in planes at substantially 90° to one another; and
   inserting said first and second workpieces into said insert slots of said upper valve body.

4. The method according to claim 3, wherein said joining step comprises brazing which includes:
   applying a brazing compound adjacent said slots of said central portions and adjacent said insert slots of said upper valve body following said attachment of said first and second workpiece and said insertion of said first and second workpieces into said upper valve body; and
   heating said workpiece and said upper valve body so that said brazing compound melts and flows joining said workpieces and upper valve body together following the removal of said heat.

5. The method according to claim 1, wherein said upper valve body having two slots oriented at substantially 90° to one another, said engagement and insertion step comprising:
   bending each workpiece at approximately the center of said central portion so that the leg members of each said workpiece are oriented at substantially 90° to one another; and
   inserting said workpieces into said insert slots of said upper valve body wherein each leg member is at substantially 90° with respect to adjacent leg members.

6. The method according to claim 5, wherein said joining step comprises brazing which includes:
   applying a brazing compound adjacent said bent portions of said workpieces and said slots of said upper valve body following said engagement and insertion step; and
   heating said workpieces and said upper valve body so that said brazing compound melts and flows joining said workpieces and said upper valve body together following the removal of said heat.

7. The method according to claim 1, wherein said upper valve body having a slot, said engagement and insertion step comprising:
   bending each said workpiece at the approximate junction of each leg member with said central portion; and
   inserting said workpieces into said slot of said upper valve body.

8. The method according to claim 7, wherein said joining step comprises brazing which includes:
   applying a brazing compound adjacent said bent portions of said workpieces and said slot of said upper valve body following said engagement and insertion step; and
   heating said workpieces and said upper valve body so that said brazing compound melts and flows joining said workpieces and said upper valve body together following the removal of said heat.

9. The method according to claim 2, 4, 6 or 8, wherein said brazing compound comprises copper.

10. The method according to claim 2, 4, 6 or 8, wherein said brazing compound comprises nickel.

11. The method according to claim 2, 4, 6 or 8, wherein said brazing compound comprises silver.

12. The method according to claim 2, 4, 6 or 8, wherein said brazing compound comprises copper and zinc.

13. The method according to claim 2, 4, 6 or 8, wherein said brazing compound comprises copper and an acrylic.

14. A method for manufacturing the guide base of a valve from flat plate and attaching said guide base to an upper valve body, said method comprising the steps of:
   stamping out from flat plate first and second workpieces, each said workpiece having at least two leg members and a central portion between said leg members;
   applying a brazing compound to the surfaces of said workpieces by electroplating;
   engaging said central portions of said first and second workpieces and inserting said central portions of said workpieces into said upper valve body; and heating said workpieces and said upper valve body melting said brazing compound and permitting said brazing compound to flow joining said workpieces and said upper valve body following the removal of said heat.

15. A method for manufacturing the guide base of a valve from flat plate and attaching said guide base to an upper valve body, said method comprising the steps of:

stamping out from flat plate first and second workpieces, each said workpiece having at least two leg members and a central portion between said leg members;

engaging said central portions of said first and second workpieces and inserting said central portions of said workpieces into said upper valve body;

applying a brazing compound adjacent the engagement of said central portions and adjacent the insertion of said central portions into said upper valve body; and heating said workpieces and said valve body melting said brazing compound and permitting said brazing compound to flow joining said workpieces and said upper valve body following the removal of said heat.

* * * * *